(12) United States Patent
Bar-Sever et al.

(10) Patent No.: US 9,261,597 B2
(45) Date of Patent: *Feb. 16, 2016

(54) REAL-TIME AND POST-PROCESSED ORBIT DETERMINATION AND POSITIONING

(71) Applicant: CALIFORNIA INSTITUTE OF TECHNOLOGY, Pasadena, CA (US)

(72) Inventors: Yoaz E. Bar-Sever, Altadena, CA (US); William I. Bertiger, Altadena, CA (US); Angela R. Dorsey, La Canada Flintridge, CA (US); Nathaniel E. Harvey, La Canada Flintridge, CA (US); Wenwen Lu, La Canada Flintridge, CA (US); Kevin J. Miller, La Canada Flintridge, CA (US); Mark A. Miller, La Canada Flintridge, CA (US); Larry J. Romans, South Pasadena, CA (US); Anthony J. Sibthorpe, La Canada Flintridge, CA (US); Jan P. Weiss, La Canada Flintridge, CA (US); Miquel Garcia Fernandez, La Canada Flintridge, CA (US); Jason Gross, La Canada Flintridge, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/708,066

(22) Filed: May 8, 2015

(65) Prior Publication Data

US 2015/0234052 A1 Aug. 20, 2015

Related U.S. Application Data

(63) Continuation of application No. 14/256,813, filed on Apr. 18, 2014, now Pat. No. 9,057,780.

(60) Provisional application No. 61/813,579, filed on Apr. 18, 2013.

(51) Int. Cl.
| | | |
|---|---|---|
| G01C 21/00 | (2006.01) | |
| G01S 19/13 | (2010.01) | |
| G01S 19/07 | (2010.01) | |
| G01S 19/05 | (2010.01) | |
| G01S 19/02 | (2010.01) | |

(52) U.S. Cl.
CPC .............. G01S 19/13 (2013.01); G01S 19/02 (2013.01); G01S 19/05 (2013.01); G01S 19/07 (2013.01)

(58) Field of Classification Search
USPC .......................................... 701/468
See application file for complete search history.

(56) References Cited

U.S. PATENT DOCUMENTS

| | | | | |
|---|---|---|---|---|
| 9,057,780 B2* | 6/2015 | Bar-Sever | ............... | G01S 19/13 |
| 2009/0295630 A1* | 12/2009 | Wengler | ............... | G01S 19/05 |
| | | | | 342/357.29 |
| 2011/0090116 A1* | 4/2011 | Hatch | ............... | G01S 19/07 |
| | | | | 342/357.59 |
| 2012/0176271 A1* | 7/2012 | Dai | ............... | G01S 19/04 |
| | | | | 342/357.44 |
| 2015/0036724 A1* | 2/2015 | Van Dierendonck | ... | G01S 19/42 |
| | | | | 375/147 |

* cited by examiner

*Primary Examiner* — Hussein A. Elchanti
(74) *Attorney, Agent, or Firm* — Steinfl & Bruno LLP

(57) ABSTRACT

Novel methods and systems for the accurate and efficient processing of real-time and latent global navigation satellite systems (GNSS) data are described. Such methods and systems can perform orbit determination of GNSS satellites, orbit determination of satellites carrying GNSS receivers, positioning of GNSS receivers, and environmental monitoring with GNSS data.

37 Claims, 3 Drawing Sheets

REAL-TIME AND POST-PROCESSED ORBIT DETERMINATION AND POSITIONING

CROSS REFERENCE TO RELATED APPLICATIONS

The present application is a Continuation of U.S. application Ser. No. 14/256,813 filed Apr. 18, 2014 which, in turn claims priority to U.S. Provisional Patent Application No. 61/813,579, filed on Apr. 18, 2013, all of which are incorporated herein by reference in their entirety.

STATEMENT OF INTEREST

The invention described herein was made in the performance of work under NASA contract NNN12AA01C, and is subject to the provisions of Public Law 96-517 (35 USC 202) in which the Contractor has elected to retain title.

TECHNICAL FIELD

The present disclosure relates to global navigation satellite systems (GNSS). More particularly, it relates to real-time and post-processed orbit determination, positioning, timing, and environmental monitoring with GNSS.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

SUMMARY

Figure 1:
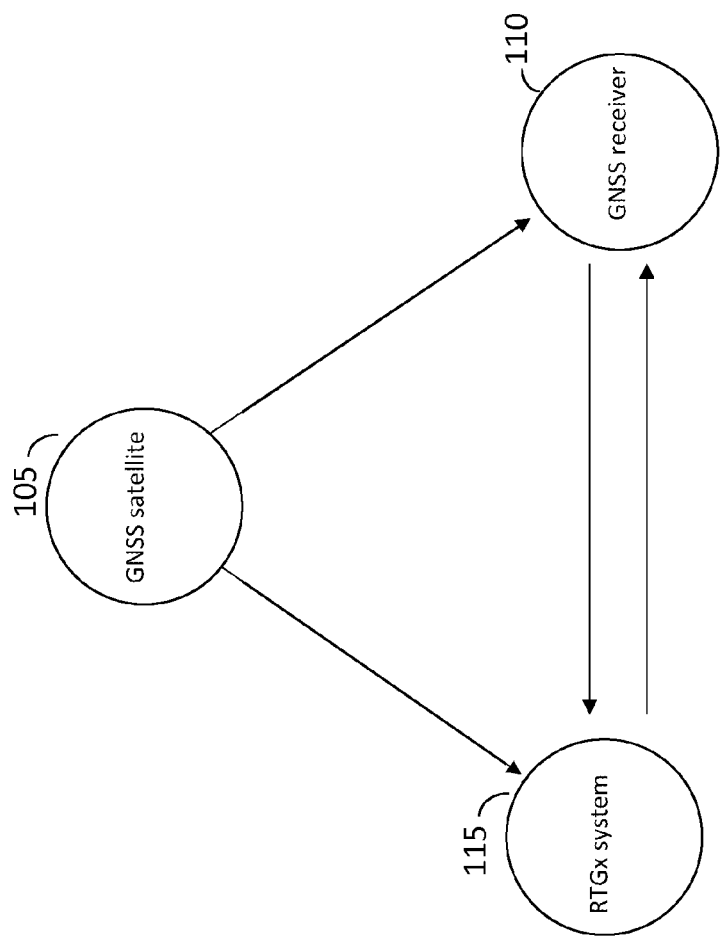
FIG. 1 illustrates an exemplary system of the present disclosure

In a first aspect of the disclosure, a method is described, the method comprising: receiving, by a computer, measurements from at least one global navigation satellite system (GNSS) receiver; analyzing, by a computer, the measurements, thereby detecting and flagging anomalous measurements and phase breaks; calculating, by a computer, high-fidelity satellite and signal models that approximate the measurements, wherein the models comprise a plurality of model parameters having a priori values; estimating, by a computer, values for the plurality of model parameters affecting orbital and clock states of a GNSS satellite or affecting reception of said measurements by the at least one GNSS receiver, wherein the estimating is based on the measurements, thereby obtaining a plurality of estimated model parameters; calculating, by a computer, improved orbital and clock states based on the plurality of estimated model parameters and the measurements; calculating, by a computer, refined model parameters, additionally to the improved orbital and clock states, based on the plurality of estimated model parameters and the measurements; and transmitting, by a computer, the improved orbital and clock states and the refined model parameters to the at least one GNSS receiver.

DETAILED DESCRIPTION

The present disclosure relates to technology for accurate and efficient processing of real-time and latent global navigation satellite systems (GNSS) data for the purpose of performing orbit determination of the GNSS satellites, orbit determination of satellites carrying GNSS receivers, predictions of the orbit and clock states of the GNSS satellites, positioning of GNSS receivers, and certain environmental monitoring with GNSS data. The technology, encompassing algorithms, their efficient software and hardware implementation, and processing techniques, is referred to as RTGx. The typical applications of RTGx revolve around the processing of GNSS measurements from one or more GNSS receivers, and the estimation of the orbital states of the transmitting satellites and/or the position of the receivers and/or environmental parameters that impact the GNSS measurements, such as Earth orientation and signal delay due to various atmospheric constituents. Real-time applications involve the processing of continuous streams of GNSS measurements and the production of solutions with latencies of a few seconds (typically 1 to 6 seconds). Post-processing applications are carried out in an effort to achieve higher accuracy than real-time applications, and involve the processing of batches of data read from files, and the production of solutions with latencies that are typically one hour or longer. The latency is defined relative to the epoch of the GNSS measurement collection in the receiver.

RTGx has heritage in JPL's FORTRAN-language GPS-Inferred Positioning System (GIPSY) software and associated algorithms, which were designed for post-processing applications, and in JPL's C-language Real Time GIPSY (RTG) software and associated algorithms, which were designed for real-time applications. However, RTGx is a completely new software, written in C++, possessing a different architecture, and many different algorithms than either GIPSY or RTG. It possesses many novel features, and is capable of operating in both real-time and post-processing applications.

RTGx can be used to process GNSS data and provide orbital, position, and environmental monitoring products in a variety of operational scenarios, including:

Receive real-time GNSS measurements from a network of terrestrial GNSS receivers, and estimate in real time the orbital and clock states of the GNSS satellite.

In addition to the above, estimate in real-time the position and clock states of terrestrial or airborne GNSS receivers, whether stationary or moving.

In addition to the above, estimate in-real-time key parameters pertaining to the state of the troposphere above each GNSS receiver, such as the zenith tropospheric delay and tropospheric delay gradients.

In addition to the above, estimate in real-time key parameters pertaining to the state of the ionosphere above each receiver, such as the total electron content.

In addition to the above, estimate in real-time key parameters pertaining to the dynamic forces acting on the GNSS satellites, such as solar scale, solar-Y-bias, Earth radiation scale, constant accelerations, and once-per-orbital-revolution accelerations.

Estimate in real-time the attitude states of the GNSS satellite, such as the yaw angle, and the yaw angle rate of change.

Estimate in real-time the physical properties of the GNSS satellites, such as the area, reflectivity properties, and thermal properties of the various surface panels that make up the satellite structure.

Derive and disseminate real-time corrections to the broadcast ephemerides that are transmitted from the GNSS satellites. The corrections are based on the real-time estimates of orbit and clock states of the GNSS satellites.

Estimate in real-time the inter-signal bias between pairs of signals transmitted by the GNSS satellites (such as L1P and L1CA), by estimating and comparing two satellite clock states, for example one estimated from one set of signals (such as L1P and L2P, which form an ionospheric-free range measurement), and the second estimated from another set of signals (such as L1CA and L2P, which also form an ionospheric-free range measurement).

Perform all of the above in post-processing, targeting higher accuracies.

Predict into the future the orbit and clock states of the GNSS satellites by fitting, for example using the RTGx Kalman filter, a set of orbit and clock model parameters to a time series of past solutions, and propagating the model forward in time.

Receive measurements from a GNSS receiver on board an Earth orbiting satellite, and infer the orbit and clock states of that satellite.

GNSS currently encompasses the U.S. Global Positioning System (GPS), the Russian Globalnaya Navigatsionnaya Sputnikovaya Sistema (GLONASS), the Chinese BeiDou, the European Union Galileo, the Japanese Quazi Zenith Satellite System (QZSS), and the Indian Regional Navigation Satellite System (IRNSS). It may in the future encompass additional, similarly designed navigation systems.

As understood by the person skilled in the art, GNSS positioning is carried out using ranging signals, consisting of phase and pseudorange data, transmitted by the GNSS satellites and recorded in receivers. Each satellite transmits a signal with a time stamp indicating when it was sent. The receiver records the receive time as well as the difference between the receive time and transmit time, which is proportional to the distance between the satellite transmitter and the receiver. To calculate the position of the receiver, it is also necessary to determine the orbit of the satellite (ephemeris) and to correct for the transmitter and receiver clock errors, as well as myriad other physical phenomena impacting the ranging signals. The GNSS satellite transmits information about the key parameters impacting the ranging signal and usage models. In particular, it broadcasts its own orbit and clock states based on predicted orbit and clock states, derived and uploaded to the GNSS satellites by their respective ground control segment. These predicted states typically possess larger errors relative to the satellite orbit and clock states than can be estimated in real time using a global network of receivers.

RTGx can support multi-mode operations: real-time, post-processing, or simulated-real-time. Simulated real-time can allow high-fidelity testing of real-time applications, which are difficult to validate prior to deployment. The simulated real-time testing can be played at arbitrary rates, including faster than the original data rate. For example, a large set of measurements taken every second can be replayed at a faster data rate (such as 0.001 second), allowing for rapid testing of performance. This capability can speed up the development and validation time, and reduce the development risk of real-time orbit determination and positioning systems.

The employment of RTGx within real-time network-based orbit determination operations enables a more accurate representation of the orbit and clock states of the GNSS satellites than the information in the GNSS broadcast ephemeris, allowing a correction for the GNSS broadcasted orbit and clock information. Such corrections have global validity and can be used by every GNSS receiver. In other words, RTGx is designed to accurately estimate the orbit and clock states of GNSS satellites, and to correct the broadcast ephemeris of the GNSS satellites.

The employment of RTGx within non-real-time, network-based GNSS orbit determination operations enables a more accurate representation of the orbit and clock states of the GNSS satellites than can be done in real-time. The resulting GNSS orbit and clock states can be used in positioning, orbit determination, timing, and environmental monitoring applications demanding the highest accuracy. Such applications comprise plate tectonics, terrestrial reference frame determination, climate monitoring, gravity recovery, time synchronization, and orbit determination of scientific satellites for monitoring sea level.

RTGx can also process non-GNSS radiometric data such as DORIS (Doppler Orbitography and Radiopositioning Integrated by Satellite) and SLR (Satellite Laser Ranging). These data types, with or without GNSS data, can be used for orbit determination of Earth satellites, for climate monitoring, for geodetic applications such as plate tectonics, and for the determination of the terrestrial reference frame.

RTGx implements multiple optional algorithms for solving (or integrating) ordinary differential equations (for orbit propagation), comprising the variable step Adams-type predictor corrector algorithm, and several Embedded Runge-Kutta-type algorithms with adaptive step size.

The Embedded Runge-Kutta methods feature a general-purpose high-order interpolation algorithm to facilitate output of solutions at points in the interior of the Runga-Kutta step size (also known as Dense Output).

The Embedded Runge-Kutta methods may also feature an independent residual evaluator, which can be used to evaluate and verify the convergence of a numerical solution to the analytic solution when the analytic solution is unknown, which is always the case in orbit determination applications. It is, therefore, a powerful tool for assessing the fidelity of the numerical solutions.

The Embedded Runge-Kutta methods may feature a global error bound for the integrated state at any given time, defined as the sum of the Richardson extrapolation error (the absolute difference between a three-step Richardson extrapolation and a two-step Richardson extrapolation), and the absolute value of the difference between the integrated state at two consecutive steps.

The Adams-type predictor corrector method may feature an interpolation algorithm to facilitate output of solutions at points in the interior of the integration step size. The interpolation has the same local truncation error as that of the corrected Adams update step, and is consistent with the end points of the integration step.

The orbit propagator can account for various types of discontinuities in the forces acting on satellites, including discontinuities due to eclipses and due to satellite maneuvers. It can accommodate user-specified discontinuous source functions, also known as G-Stops. Such discontinuities can be automatically detected, and the orbit propagation process can be stopped and restarted on the discontinuity in order to optimize the accuracy of the propagation.

Partial derivatives of all satellite dynamics models and all signal propagation models relative to estimable parameters are computed analytically for optimal accuracy and numerical precision.

RTGx employs a square root information filter (SRIF) for parameters estimation. The filter has many powerful capabilities designed to enable efficient and accurate solution of massive orbit determination and positioning problems in real-time and in post-processing. These include the following capabilities: add and remove parameters on the fly; smoothing backward or forward; filter or smooth multiple updates simultaneously; compute sigmas and covariances by applying pseudo-measurements, or by rotating columns of the SRI matrix and re-upper-triangularizing; apply phase bias ambiguity constraints; first order Gauss-Markov stochastic attributes can be assigned to any estimable parameter; use Householder transformations rather than Givens rotations wherever possible, by temporarily breaking upper triangularity of the SRI matrix to estimate the required parameters.

The SRIF can be configured to run as a current-state filter, or as a pseudo-epoch state filter. Pseudo-epoch state formulation cuts down on memory and computational requirements when some of the estimated parameters representing orbital dynamics have stochastic attributes.

RTGx also employs a UD smoother that can run with or without phase bias integer ambiguity resolution. UD is a mathematical method known to the person skilled in the art.

The RTGx filter supports on-the-fly decoupling/recoupling of satellites and/or stations. This capability enables the efficient handling of poorly modeled satellites or stations within a network-based orbit determination filter, optimizing the solution accuracy for these entities without compromising the solution accuracy for the remaining network. Decoupling is equivalent to infinitely de-weighting the data of the decoupled satellite and/or station. This capability can be used to protect the filter from anomalous or poorly performing satellites or receiver while still estimating the state of the decoupled satellite or receiver.

The positioning of GNSS tracking sites as decoupled states within a network-based orbit determination filter can realize improved accuracy relative to a traditional point-positioning approach, where the GNSS orbit and clock states are provided externally and are presumed perfect. Consequently, the formal errors (in the form of a covariance matrix) resulting from the decoupled positioning approach form a more realistic representation of the positioning error than with the traditional point-positioning approach.

RTGx has a Hot-Start capability. This capability supports regular or commanded storage of the complete information pertaining to a filter state, even during real-time operations. Correspondingly, RTGx can ingest this information to restart its estimation without being impacted by convergence time associated with conventional cold or warm start techniques. This Hot-Start capability is crucial to operational efficiency in real-time network-based orbit determination systems by enabling debugging and overcoming estimation problems using fast replay of past stored solutions.

RTGx can ingest measurements of pseudorange and phase via shared memory or files. Shared memory can be used for real-time applications, and files can be used for simulations of real-time measurements or for post-processing.

RTGx possesses a unique user interface, called RTG-Tree. The interface represents the required RTGx input as a tree-branches-leaves concept to enable intuitive usage and ease of use while maintaining highly diverse input options.

RTG-Tree implements the concept of inheritance to simplify the input of complex yet repetitive data for network-based orbit determination. With inheritance, a complex set of branches and leaves defined somewhere in the tree can be named as an object, and that name, with the attendant branch-leaves information can be used elsewhere in the tree to reduce duplication of input option and better clarity.

RTGx can perform integer GNSS phase bias ambiguity resolution during a network-based orbit determination in real-time (without smoothing) and in post-processing (with smoothing). RTGx can apply the resolved integer phase biases to enhance the accuracy of point positioning solutions in real-time and in post-processing.

RTGx implements unique solar radiation force models for GNSS satellites, including empirical models from the JPL GSPM family of models, tabulated models, Fourier expansions, and smoothed tabulated models via a Fourier series approximation. The latter model can replace tabulated data with an approximation based on arbitrary order Fourier series. The Fourier series representation is free of the discontinuities typically present in tabulated data and supports faster orbit integration.

RTGx possesses both threads and Message Passing Interface (MPI) capabilities to take advantage of available multiple cores and/or CPUs, and efficiently process massive amounts of data. All of the filter capability of RTGx have been designed to take advantage of these parallel processing option RTGx can implement flexible orbit and clock prediction algorithms that are based on past estimates of the orbital and clock states. The prediction can be carried out in two steps. At first a parameterized model can be fit to a time series of the satellite orbit or clock. At the second step, after the model parameters have been estimated, the model can be propagated forward in time.

RTGx can model pseudorange biases for each pair of satellite and receiver, which are a feature of the GLONASS signals.

RTGx can receive as input orbital states that are treated as truth. Likewise, RTGx can receive as input a time series representation for any estimable model parameter, together with their formal errors (sigmas), and treat them as truth or as a-priori guesses weighted by their formal error.

To support the processing of massive amounts of data and high data rate, RTGx can be configured to operate as a pair of filters, each with a different data rate. The first filter can perform the orbit determination with a relatively slow data rate. The second filter can ingest the slowly-varying orbit solutions from the first filter and estimate the clock solution at a higher rate. This configuration of 'slow' and 'fast' filter pairs is highly efficient since it avoids estimating the orbital parameters at high rate.

The RTGx underlying design supports fairly arbitrary radiometric measurements that include not only GNSS phase and range but also Doppler and Satellite Laser Ranging (SLR).

Some scopes of the present disclosure are:

Perform real-time orbit determination of GNSS satellites based on phase and pseudorange measurements from a network of receivers;

Predict the GNSS orbit and clock solutions forward in time based on an aggregate of real-time orbit and clock states;

Form the difference between the real-time GNSS orbit and clock states as determined in a real-time orbit determination system and the broadcast ephemeris, and format the differences as differential corrections to the broadcast ephemeris;

Perform GNSS orbit determination in post-processing using backward and/or forward smoothing and other data processing techniques for the highest possible accuracy;

Determining position and clock states of GNSS receivers given phase and range measurements from the receivers, and given the orbit and clock states of the GNSS satellites (point-positioning);

Determining various environmental parameters impacting the GNSS signal, such as Earth orientation (polar motion, polar motion rates, Earth hour angle, earth rotation rates), tropospheric delay (zenith delay and gradients), and ionospheric delay;

Achieve high operational reliability in orbit determination and positioning applications, as required for some operational applications, and particularly for the primary application of operating GPS—one of the most critical infrastructures in the world, and for real-time applications;

Achieve long-term maintainability over a life cycle spanning decades;

Achieve flexibility to accommodate changes to input and requirements over its lifetime, in particular, coping with multiple GNSS constellations and data types.

RTGx is the core software used in the operations of the JPL Global Differential GPS (GDGPS) System. GDGPS is a GPS augmentation system on a global scale. The fundamental tenet of this architecture is a state-space approach, where the orbits of the GPS satellites are modeled with great accuracy, and the primary estimated parameters are the satellite orbital states and instantaneous clock offset. The clock offsets can be estimated as white noise process every epoch. This approach guarantees that the estimated ephemerides are globally and uniformly valid.

RTGx is the core navigation software for the next generation GPS ground control system (OCX). For OCX, RTGx is tasked with performance the GPS real-time orbit determination operations, the orbit predictions, and with monitoring the clocks on the GPS satellite.

FIG. 1 illustrates an exemplary system of the present disclosure. For example, a GNSS satellite (105) may transmit a range signal to a GNSS receiver (110). In some embodiments, the RTGx system (115) may also receive data from a GNSS satellite (105). The GNSS receiver (110) may transmit data to the RTGx system (115). The RTGx system (115), having calculated improved orbital and clock states, as well as improved positioning, may broadcast data to the GNSS receiver (110).

Figure 2:
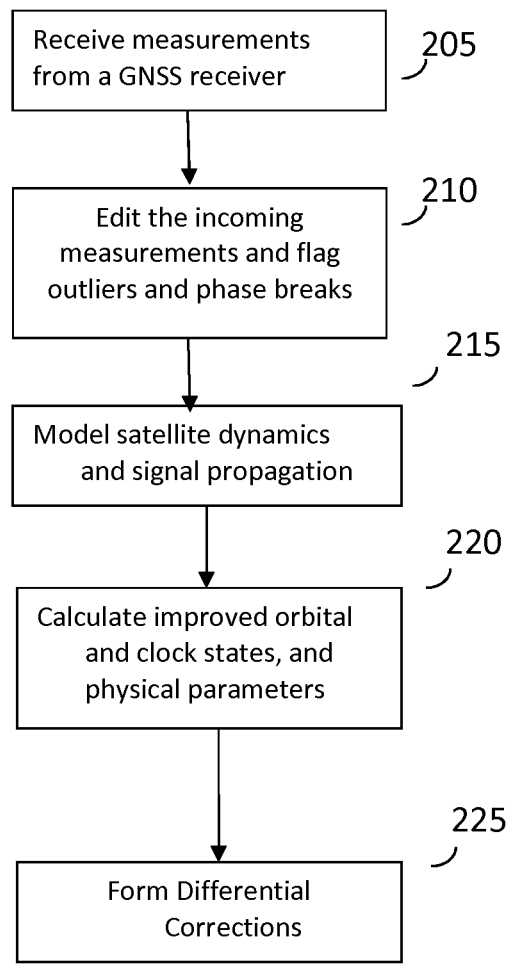
FIG. 2 illustrates an example of a flowchart for the methods of the present disclosure.

FIG. 2 illustrates an example of a flowchart for the methods of the present disclosure. The RTGx system may receive measurements from a GNSS receiver (205), edit the data on the fly or in post-processing to detect and flag anomalous data (210), compute the relevant high-fidelity satellite and signal models (215), calculate improved orbital and clock states and relevant physical parameters (220), and replace the broadcast ephemeris with the improved states (225).

In some embodiments, streaming of the improved states of the systems of the present disclosure may be done through an internet connection, cell network, satellite communications, or other radio communications.

Figure 3:
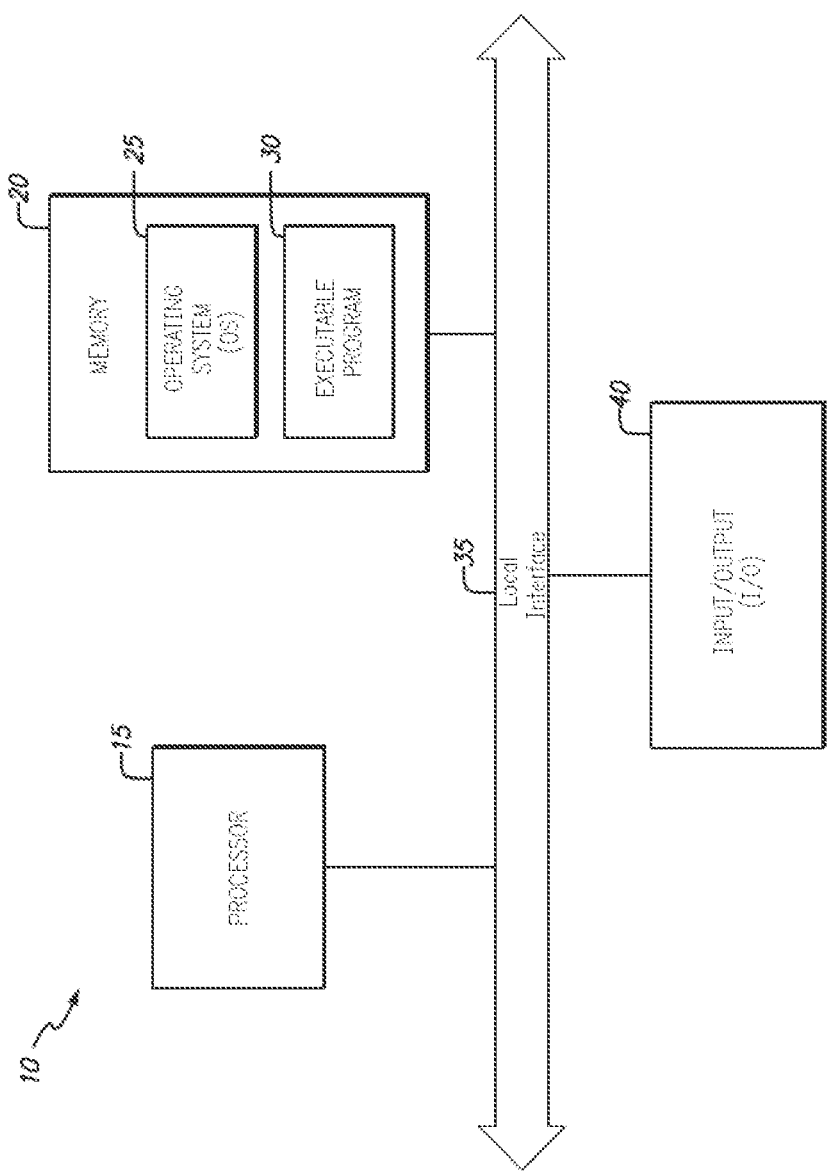
FIG. 3 depicts an exemplary embodiment of a target hardware for implementation of an embodiment of the present disclosure.

FIG. 3 is an exemplary embodiment of a target hardware (10) (e.g., a computer system, potentially with multiple cores and/or multiple CPUs) for implementing the embodiment of FIGS. 1 and 2. This target hardware comprises a processor (15), a memory bank (20), a local interface bus (35) and one or more Input/Output devices (40). The processor may execute one or more instructions related to the implementation of FIGS. 1 and 2, and as provided by the Operating System (25) based on some executable program (30) stored in the memory (20). These instructions are carried to the processor (15) via the local interface (35) and as dictated by some data interface protocol specific to the local interface and the processor (15). It should be noted that the local interface (35) is a symbolic representation of several elements such as controllers, buffers (caches), drivers, repeaters and receivers that are generally directed at providing address, control, and/or data connections between multiple elements of a processor based system. In some embodiments the processor (15) may be fitted with some local memory (cache) where it can store some of the instructions to be performed for some added execution speed. Execution of the instructions by the processor may require usage of some input/output device (40), such as inputting data from a file stored on a hard disk, inputting commands from a keyboard, inputting data and/or commands from a touchscreen, outputting data to a display, or outputting data to a USB flash drive. In some embodiments, the operating system (25) facilitates these tasks by being the central element to gathering the various data and instructions required for the execution of the program and provide these to the microprocessor. In some embodiments the operating system may not exist, and all the tasks are under direct control of the processor (15), although the basic architecture of the target hardware device (10) will remain the same as depicted in FIG. 3. In some embodiments a plurality of processors may be used in a parallel configuration for added execution speed. In such a case, the executable program may be specifically tailored to a parallel execution. Also, in some embodiments the processor (15) may execute part of the implementation of FIGS. 1 and 2, and some other part may be implemented using dedicated hardware/firmware placed at an Input/Output location accessible by the target hardware (10) via local interface (35). The target hardware (10) may include a plurality of executable programs (30), wherein each may run independently or in combination with one another.

The methods and systems described in the present disclosure may be implemented in hardware, software, firmware or any combination thereof. Features described as blocks, modules or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), a field programmable logic array (FPGA), a graphic processing unit (GPU) or a general purpose GPU, or parallel computing processors).

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

What is claimed is:

1. A method comprising:
receiving, by one or more computers, measurements from at least one global navigation satellite system (GNSS) receiver;
analyzing, by the one or more computers, the measurements, thereby detecting and flagging anomalous measurements and phase breaks;
calculating, by the one or more computers, high-fidelity satellite and signal models that approximate the measurements, wherein the models comprise a plurality of model parameters having a priori values;
estimating, by the one or more computers, values for the plurality of model parameters affecting orbital and clock states of a GNSS satellite or affecting reception of said measurements by the at least one GNSS receiver, wherein the estimating is based on the measurements, thereby obtaining a plurality of estimated model parameters;
calculating, by the one or more computers, improved orbital and clock states based on the plurality of estimated model parameters and the measurements;
calculating, by the one or more computers, refined model parameters, additionally to the improved orbital and clock states, based on the plurality of estimated model parameters and the measurements; and
transmitting, by the one or more computers, the improved orbital and clock states and the refined model parameters to the at least one GNSS receiver.

2. The method of claim 1, further comprising:
calculating, by a computer, a position of the at least one GNSS receiver.

3. The method of claim 1, wherein the transmitting, by a computer, the improved orbit and clock states is within 6 seconds from the receiving, by a computer, the measurements from the at least one GNSS receiver.

4. The method of claim 1, wherein the transmitting is streaming through an internet connection, cell network, satellite communications, or other radio communications.

5. The method of claim 1, wherein the plurality of physical parameters is chosen from the group consisting of: solar pressure scale and Y-Bias, Earth radiation scale, satellite physical properties, constant accelerations, once-per-orbital-revolution accelerations satellite yaw angle and rate, state of troposphere, state of ionosphere, gravitational harmonics, Earth orientation, polar motion, polar motion rates, Earth hour angle, earth rotation rates, tropospheric delay, zenith delay and gradients, real-valued phase biases, and ionospheric delay.

6. The method of claim 1, further comprising:
estimating, by a computer, inter-signal bias between pairs of signals transmitted by the GNSS satellite.

7. The method of claim 1, further comprising:
receiving and processing, by a computer, measurements of doppler orbitography and radiopositioning integrated by satellite (DORIS) or satellite laser ranging (SLR).

8. The method of claim 1, further comprising:
performing, by a computer, on-the-fly decoupling and recoupling of GNSS satellites states and/or GNSS stations states in a filter.

9. The method of claim 8, further comprising estimating, by a computer, a position of the at least one GNSS receiver as a decoupled state within a network-based orbit-determination filter.

10. The method of claim 1, further comprising:
performing, by a computer, integer GNSS phase bias ambiguity resolution during a network-based orbit determination.

11. The method of claim 1, wherein the estimating further comprises implementing, by a computer, solar radiation force models for the GNSS satellite.

12. The method of claim 1, wherein the analyzing is on the fly or in post-processing.

13. The method of claim 1, further comprising:
producing data records at a specified time by a first filter; and
reading the data records at a time later than the specified time, by a second filter,
thereby continuing a filtering of the first filter without loss of accuracy.

14. The method of claim 1, wherein the calculating, by a computer, high-fidelity satellite and signal models comprises modeling phase biases as time-varying stochastic processes.

15. The method of claim 1, further comprising estimating inter-signal bias between pairs of signals transmitted by GNSS satellites.

16. The method of claim 1, wherein the estimating, by a computer, values for the plurality of model parameters comprises estimating, by a computer, through a parameter estimation filter of square root information (SRI) type.

17. The method of claim 16, wherein the estimating through the SRI filter comprises at least one of the following steps:
adding or removing parameters on the fly;
smoothing backward or forward;
filtering or smoothing multiple updates simultaneously;
computing sigmas and covariances by applying pseudo-measurements, or by rotating columns of the SRI matrix and re-upper-triangularizing;
applying phase bias ambiguity constraints;
assigning first order Gauss-Markov stochastic attributes to any estimable parameter;
using Householder transformations rather than Givens rotations, by temporarily breaking upper triangularity of the SRI matrix to estimate the required parameters.

18. The method of claim 17, wherein the SRI filter can be configured to run as a current-state filter, or as a pseudo-epoch state filter.

19. The method of claim 1, further comprising partitioning, by a computer, a filter into multiple processes, wherein the multiple processes run concurrently on multiple processing units and communicate with a message passing interface (MPI).

20. The method of claim 1, further comprising partitioning, by a computer, a filter into multiple threads running concurrently on multiple processing cores on a same computer.

21. The method of claim 1, further comprising estimating, by a filter, signal range biases between a GNSS transmitter and the at least one GNSS receiver pair.

22. The method of claim 1, wherein the measurements are simulated or replayed from archive.

23. The method of claim 1, wherein the measurements are read from shared memory or from files.

24. The method of claim 1, further comprising integrating, by a computer, orbits by an Embedded Runge-Kutta method with adaptive step site, or a variable step Adams-type predictor corrector.

25. The method of claim 24 wherein the Embedded Runge-Kutta method comprises a general-purpose high-order interpolation algorithm.

26. The method of claim 24 wherein the Embedded Runge-Kutta method comprises an independent residual evaluator.

27. The method of claim 24 wherein the Embedded Runge-Kutta method comprises a global error bound for the integrated orbits.

28. The method of claim 24 wherein the integrating comprises interpolating by an algorithm to points at an interior of a step size.

29. The method of claim 24 wherein the integrating comprises accounting, by a computer, for various types of discontinuities in forces acting on a plurality of GNSS satellites, wherein the plurality of GNSS satellites comprise said GNSS satellite, wherein the discontinuities comprise discontinuities due to eclipses and due to maneuvers of the plurality of GNSS satellites, and wherein the integrating further accommodates user-specified discontinuous source functions.

30. The method of claim 1, further comprising computing analytically partial derivatives of all satellite dynamics models and all signal propagation models relative to estimable model parameters.

31. The method of claim 1, further comprising providing user input via a RTG-Tree interface, wherein the interface comprises inheritance attributes.

32. The method of claim 1, further comprising providing formal errors for said plurality of model parameters.

33. The method of claim 11, wherein the solar radiation force models comprise at least one of empirical models from the GPS solar pressure model (GPSM) family, tabulated models, Fourier expansions, or smoothed tabulated models via a Fourier series approximation.

34. The method of claim 1, wherein the estimating, by a computer, values for the plurality of model parameters comprises estimating in real-time an inter-signal bias between pairs of signals transmitted by the at least one GNSS receiver.

35. The method of claim 34, wherein the pairs of signals transmitted by the at least one GNSS receiver are L1P and L1CA.

36. The method of claim 35, wherein the estimating in real-time an inter-signal bias comprises estimating and comparing two satellite clock states.

37. An apparatus for aiding global navigation satellite system positioning, the apparatus comprising:
a communication link from a global navigation satellite system (GNSS) satellite to a RTGx system;
a communication link from a GNSS receiver to the RTGx system;
a communication link from the GNSS satellite to the GNSS receiver;
wherein the RTGx system is configured to generate improved orbital and clock states according to the following steps:
receiving, by one or more computers, measurements from at least one global navigation satellite system (GNSS) receiver;
analyzing, by the one or more computers, the measurements, thereby detecting and flagging anomalous measurements and phase breaks;
calculating, by the one or more computers, high-fidelity satellite and signal models that approximate the measurements, wherein the models comprise a plurality of model parameters having a priori values;
estimating, by the one or more computers, values for the plurality of model parameters affecting orbital and clock states of a GNSS satellite or affecting reception of said measurements by the at least one GNSS receiver, wherein the estimating is based on the measurements, thereby obtaining a plurality of estimated model parameters;
calculating, by the one or more computers, improved orbital and clock states based on the plurality of estimated model parameters and the measurements;
calculating, by the one or more computers, refined model parameters, additionally to the improved orbital and clock states, based on the plurality of estimated model parameters and the measurements; and
transmitting, by the one or more computers, the improved orbital and clock states and the refined model parameters to the at least one GNSS receiver.

* * * * *